Dec. 11, 1928.
T. McCARTIE
1,694,687
ELECTROLYTE LEVEL GAUGE
Filed Oct. 7, 1926
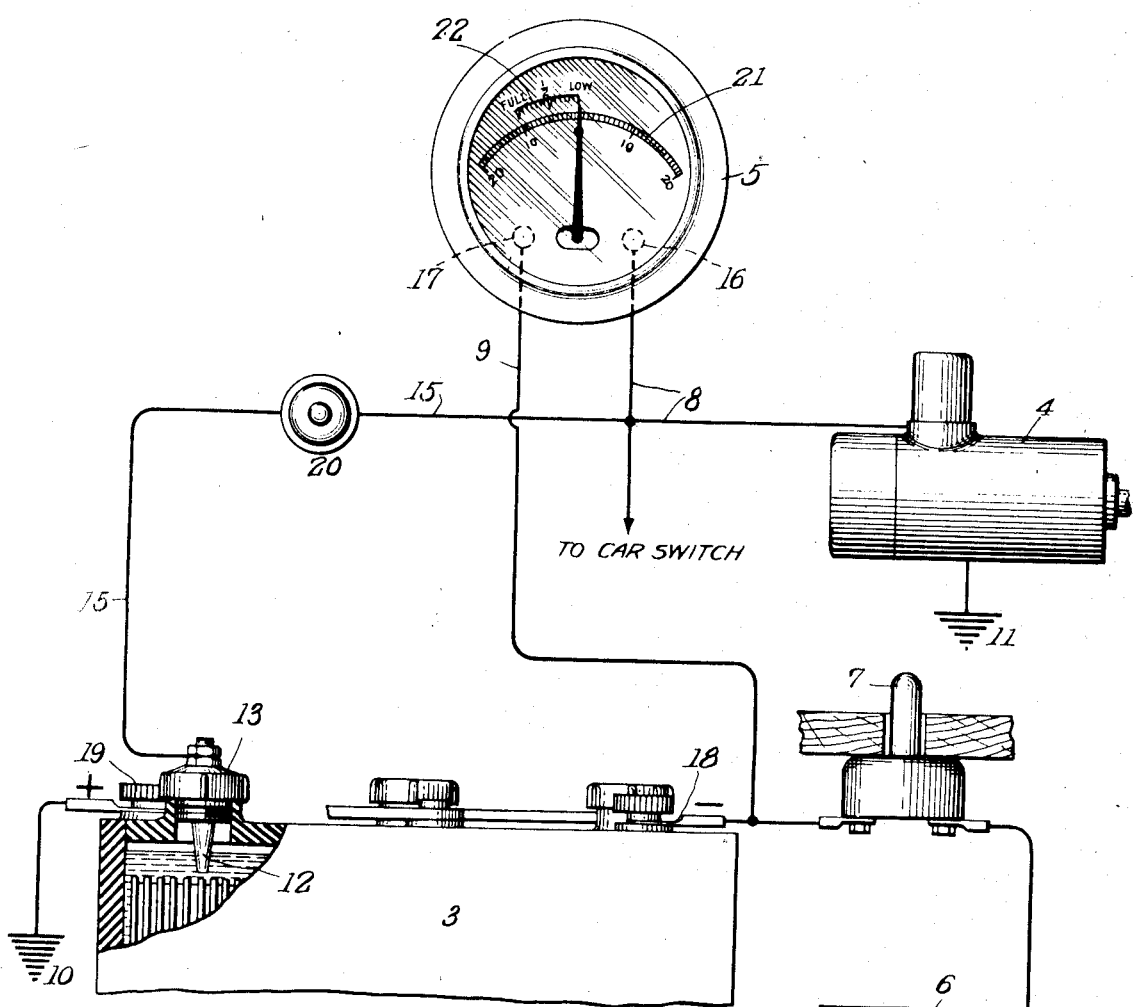
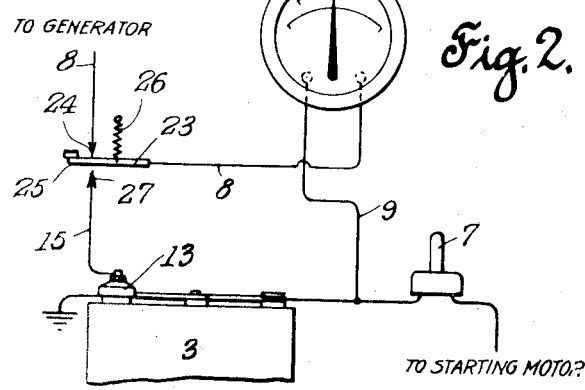
INVENTOR.
Thomas McCartie
BY Philip S. McGean
ATTORNEY Patented Dec. 11, 1928.

1,694,687

UNITED STATES PATENT OFFICE.

THOMAS McCARTIE, OF NEWARK, NEW JERSEY.

ELECTROLYTE-LEVEL GAUGE.

Application filed October 7, 1926. Serial No. 140,056.

The objects of this invention are to provide a gauge for measuring the height of the electrolyte in a storage battery and particularly to accomplish this in a simple practical way without materially adding to or complicating the present equipment usually associated with such batteries.

Most storage batteries and especially those used in motor cars have associated with them, an ammeter for indicating the rate of charge or discharge. A special feature of the invention is the utilization of this same ammeter as a device for providing a reading of the electrolyte level.

Another important novel feature of the invention is the provision of a level detecting electrode graduated in design to give a correspondingly graduated reading on the indicating instrument.

A further important novel feature of the invention is a special push button control which can be actuated at any time to secure a reading of the electrolyte level.

Other novel features of the invention will appear as the specification proceeds.

The drawing accompanying and forming part of this specification illustrates two practical embodiments of the invention.

Figure 1 is a broken partly diagrammatic view showing the invention as applied to an automobile storage battery system and with the battery level readings effected by means of a push button switch in an auxiliary circuit from one side of the ammeter to a special measuring electrode inserted in the end cell of the battery.

Figure 2 is a diagrammatic view showing the reading switch as of a biased construction to hold the generator circuit normally closed through the ammeter and adapted to be operated to open this circuit and to close the special circuit from the extra electrode to the ammeter.

One of the most practical advantages of the invention is its extreme simplicity, consisting as it does, in the main, of simply an extra electrode to dip into the electrolyte in the battery, a switch for cutting this electrode into service and the necessary connections between the electrode, switch and ammeter of the battery.

The illustrations show a typical automobile installation comprising a storage battery 3, a generator 4 for charging the same, an ammeter 5 for showing the rate of charge or discharge and a starting motor 6 taking current from the battery under control of the starting switch 7.

The ammeter is connected in series with the battery in both the charging and discharge relations by means of the connections indicated at 8, 9, a ground return for one side of the battery and for one terminal of the generator being indicated at 10, 11. These connections are the usual ones and so require no special explanation.

The extra level measuring electrode is indicated at 12 and as a matter of convenience is shown supported in and carried by the filling cap 13 of the end cell furthest removed from the end of the battery which is connected to the ammeter. This electrode is of special tapered form, as illustrated, so as to provide surface contact which is increasingly greater with the rise in liquid and hence adapted to pass enough more current to overcome the drag of the needle and thus show equal deflections of the needle for equal variations in the height of the electrolyte. The cap which carries the electrode is shown as shouldered at 14 to engage the neck of the filling opening and thus support this tapered current measuring electrode always in the same definite relation with respect to the top of the battery plates.

The electrode is connected by suitable wiring 15 with that side of the ammeter opposite the side which is connected to the far end of the battery—in this instance, to the same terminal 16 which is connected with the generator, the other terminal 17 being connected by the wiring 9 with the far or ungrounded battery terminal 18. The grounded battery terminal appears at 19 behind and disconnected from the extra electrode.

Interposed in the electrode-ammeter connections 15—8, a normally open switch is provided, the same being shown in Figure 1 as an ordinary push button switch 20 which may be mounted on the instrument panel or other convenient support.

It will be apparent that upon closing switch 20, a circuit will be completed from say the negative pole 18 of the battery by wiring 9 through the ammeter and wiring 8—15 to the measuring electrode and through the electrolyte of the end cell and the plates of the other two cells. The current flowing in this circuit will be proportionate to the extent of submersion of the electrode and the deflection of the ammeter needle will therefore give a true reading of the amount of electrolyte in the end cell. This reading may be taken directly on the usual scale of the ammeter but it is preferable to provide either above or below the usual ammeter scale 21, a special scale 22 graduated suitably to show electrolyte levels. This scale need only be a small fraction of the full ammeter scale and may be differently colored or otherwise distinguished to prevent any confusion arising from a quick reading of the instrument.

In order that the level gauge may be consulted with the motor running and hence the generator charging, as well as when the motor is off, the circuit connections may be made as in Figure 2; that is, with a switch 23 having a back contact 24 in the generator-ammeter line 8, the movable contact 25 of said switch being cut in on this generator line and biased by a spring 26 or the like so as to hold this line normally closed. The front contact 27 of this switch is connected in the electrode line 15 and is positioned to be engaged by the movable switch contact when the latter is shifted away from its biased position in engagement with the generator contact 24. When an electrolyte reading is to be taken, this switch is actuated to close a circuit from the measuring electrode through the ammeter as before, but in this instance the operation of the switch temporarily cuts the line to the generator, leaving the battery only in circuit with the ammeter and hence giving a true electrolyte reading irrespective of whether the generator is or is not in operation.

The use of the ammeter in connection with an electrode of sufficient size to pass enough current to operate the ammeter is important, giving a graduated reading and showing accurately not only whether sufficient electrolyte is present but actually how much electrolyte. The device, therefore, enables the taking of comparative readings by which the action of the battery may be observed and checked and further enables the observer to figure the rate of evaporation and calculate ahead as to about when additional water may be required.

The electrode may be made of any suitable material. A lead-antimony combination has been found suitable for the purpose and in using this type of electrode it has been found best to connect the same by its wiring with the negative side of the battery. This prevents electrochemical action and when the electrode is brought into service, causes the formation of a spongy lead rather than lead peroxide, which latter sulphates faster than the spongy lead. The flow of current, however, in any event is sufficient to break down the insulating qualities of such lead sulphate as may form. This feature of current flow is another advantage of the invention because appreciable current must actually pass to operate the ammeter and the instrument, therefore, will not give a false reading, for instance, from current leakage over the wet surfaces inside the battery cell, such as would occur with an instrument of the voltmeter type.

What is claimed is:

1. In an electrical system of the character disclosed, the combination with a storage-battery, a generator for keeping said battery charged, an ammeter and connections by which said ammeter is normally connected in service relation with said battery and generator to give a continuing reading of the battery-generator conditions, of an electrolyte measuring electrode supported to dip into the electrolyte of the storage battery, and a local circuit for said electrolyte measuring electrode and by which the electrode may be connected into the same ammeter and battery circuit previously mentioned to thereby enable said ammeter to give a battery electrolyte level reading, in addition to the reading which it normally furnishes of the battery-generator conditions.

2. A combination as in claim 1, in which the ammeter has in addition to its usual scale, an extra scale graduated to read measurements of battery electrolyte level.

In witness whereof, I have hereunto set my hand this 14th day of September, 1926.

THOMAS McCARTIE.